May 25, 1965 T. R. HERNDON 3,185,827
COMPUTER FUNCTION GENERATION
Filed Sept. 26, 1960
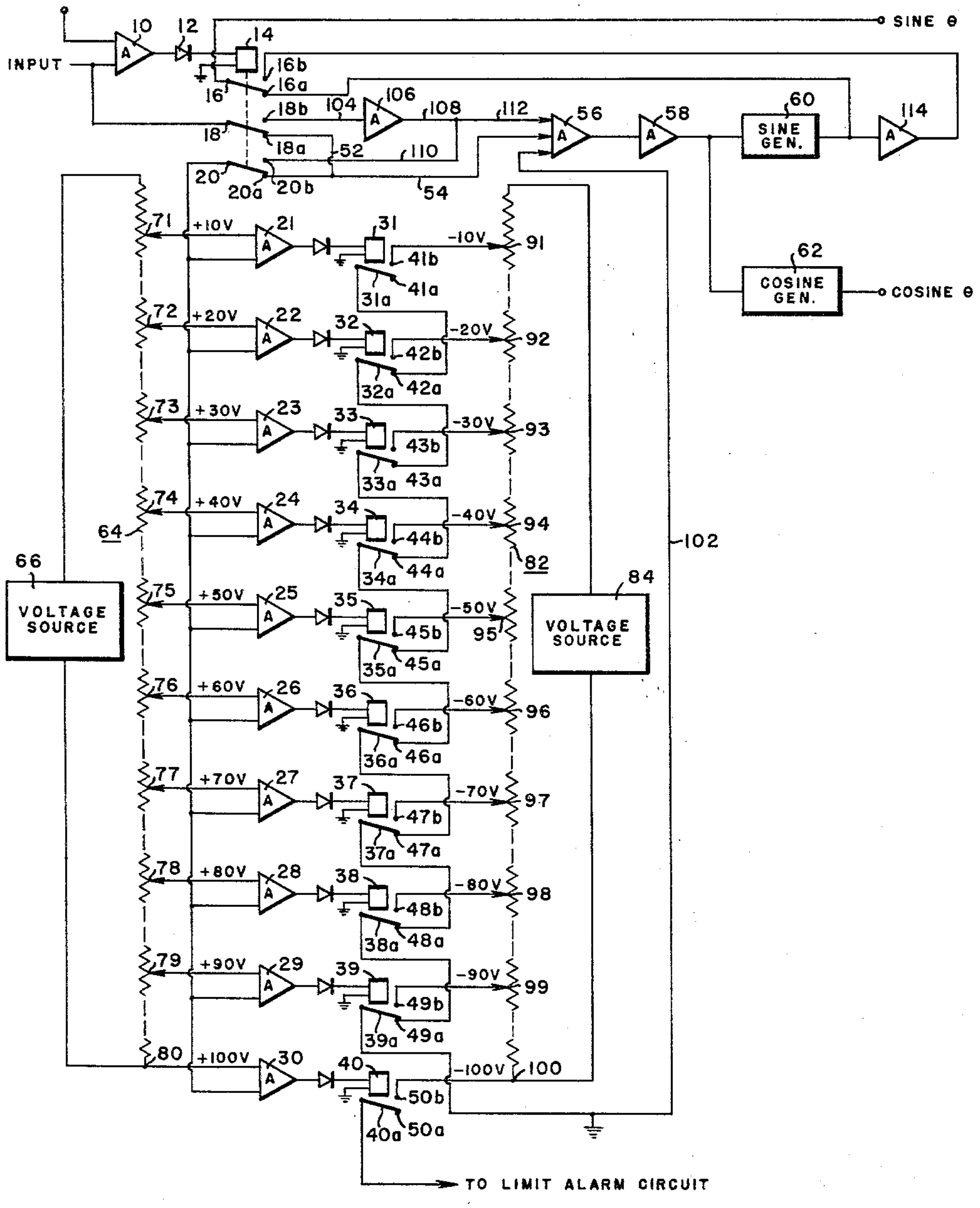
INVENTOR.
THOMAS R. HERNDON,
BY Frank S. Troidl
ATTORNEY.

United States Patent Office 3,185,827
Patented May 25, 1965

3,185,827

COMPUTER FUNCTION GENERATION

Thomas R. Herndon, Baytown, Tex., assignor, by mesne assignments, to Esso Research and Engineering Company, Elizabeth, N.J., a corporation of Delaware Filed Sept. 26, 1960, Ser. No. 58,535
6 Claims. (Cl. 235—197)

This invention relates to the production of signals representing functions of other signals.

When solving problems on an analog computer, it is sometimes necessary to perform the task of generating functions of variable signals representing angles. Often these functions are trigonometric functions such as the sine or cosine of the variable angle. Multiplying by a trigonometric function is called "resolution." This is currently done by using commercially available servo resolvers and non-linear resistances. These current systems have the disadvantage of poor frequency response so that, generally, solution times must be such that frequencies in the problem do not exceed a few cycles per second. This precludes the use of these resolvers in many types of repetitive computing equipment.

One component which provides the poor frequency response in currently utilized resolvers is the servo mechanism. This invention discloses a novel means of effecting resolution which uses practically all electronic parts and does not include therein any servo mechanism. Thus, this invention extends the frequency range of resolution and function generation to that of other computing hardware normally used with repetitive computing equipment.

The invention as well as its many advantages may be understood by reference to the following detailed description and single figure which is an electrical schematic diagram partially in block form which illustrates a preferred embodiment of the invention.

Referring to the figure, the "input" which may be derived from an analog computer is fed to a relay amplifier 10. The output from relay amplifier 10 is fed through diode 12 to the relay coil 14. The relay includes a plurality of switches 16, 18, and 20. The position of switches 16, 18, and 20 depends upon the polarity of the input signal.

The new system includes a circuit including a plurality of relay operated means which are successively responsive to predetermined algebraic signal magnitude increments. Each succeeding increment represents a successive integer of a predetermined angle, say 260°. The relay operated means includes a plurality of relay amplifiers 21 through 30. The output from each of the relay amplifiers 21 through 30 is fed through a diode to an associated relay coil. Each relay coil operates a switch. Thus, relay amplifiers 21 through 30 and their associated diode and relay coil control the position of switches 31*a* through 40*a*. Relay amplifier 21 and its associated diode and coil control the position of switch 31*a*; relay amplifier 22 and its associated diode and coil control the position of switch 32*a*, etc.

The input signal is fed to each of the relay amplifiers 21 through 30. The input signal is also fed through line 52 and line 54 to a differential amplifier 56 when the switch 18 is in the position shown in the figure. The output from differential amplifier 56 is fed through amplifier 58 to a parallel arrangement of function generators such as sine generator 60 and cosine generator 62.

A resistor 64 is connected across a voltage source 66. Voltages across the resistor 64 are supplied to each of the relay amplifiers 21 through 30 by means of taps 71 through 80. A different voltage is applied to each of the relay amplifiers 21 through 30. These voltages may increase in successive equal increments from relay amplifier 21 to relay amplifier 30, say in increments of +10 volts. Thus, if the input signal is less than 10 volts, none of the switches 31*a* through 40*a* is actuated. As, however, the input signal exceeds 10 volts, the relay amplifier 21 and associated coil switches switch 31*a* from contact 41*a* to contact 41*b*. Likewise, as the input signal approaches above 20 volts, the relay amplifier 22 and associated coil switches switch 32*a* from contact 42*a* to contact 42*b*. In the same manner, as the input voltage increases in steps of 10 volts, the relay amplifiers 23 through 30 successively move switches 33*a* through 40*a* from contacts 43*a* through 50*a* to contacts 43*b* through 50*b*.

A second large resistor 82 is connected across a voltage source 84. A negative voltage may be obtained from across the resistor 82 by means of taps 91 through 100 connected to contacts 42*b* through 50*b*. Notice that when switches 31*a* through 39*a* are in the position shown in the figure with switches 31*a* through 39*a* being in contact with contacts 41*a* through 49*a*, no signal is fed to the differential amplifier 56 through line 102. However, when the input signal exceeds +10 volts, switch 31*a* is moved from contact 41*a* to 41*b*. Thus, an algebraic signal of −10 volts is fed through switch 31*a*. Since each of the switches 31*a* through 39*a* are interconnected, the −10 volts is fed through all of these switches and line 102 to the differential amplifier 56. Thus, as switch 31*a* is moved from contact 41*a* to 41*b* when the input signal exceeds +10 volts, a −10 volts is added through line 102 to the differential amplifier 56. When the input signal exceeds +20 volts, the switch 32*a* is moved from contact 42*a* to 42*b*. Thus, −20 volts is added through line 102 to differential amplifier 56. The movement of switch 32*a* from contact 42*a* breaks the contact of the −10 volts. In a similar manner, as the input signal increases in increments of 10 volts, a negative signal in increments of 10 volts is fed through line 102 to differential amplifier 56.

In operation, assume the equipment is designed for 360° being represented by 10 volts. If the signal representing the angle is less than 10 volts and of positive polarity, the signal is fed through lines 52 and 54 through the amplifiers 56 and 58 to the sine generator 60 and the cosine generator 62. Thus, the sine and cosine functions of the input signal are obtained. As the signal representing the angle reaches 10 volts (360°), the relay amplifier 21 is actuated to move switch 31*a* from contact 41*a* to 41*b*. Thus, −10 volts is added through line 102 to the differential amplifier 56 and the algebraic difference is fed through amplifier 58 to the sine generator 60 and the cosine generator 62. The sine and cosine of an angle equal the sine and cosine of an angle plus a multiple of 360°. In a like manner, on reaching multiples of 10 volts, successive multiples of 10 volts are subtracted by successive relay amplifiers until the machine limit of 100 volts is reached. This limit is 3600°. Of course, it is to be understood that any number of relay amplifiers 21 through 30 may be utilized depending upon the amount of resolution desired.

In resolving or obtaining a function of negative angles, the negative input signal provides an output from relay amplifier 10 which is fed through coil 14. The direction of the current through coil 14 is such that switches 16, 18, and 20 are moved from contacts 16*a*, 18*a*, and 20*a*, respectively, to 16*b*, 18*b* and 20*b* respectively. Thus, the negative input signal is fed through line 104 to an inverter 106 which changes the sign of the negative signal to a signal of positive polarity. This positive polarity signal is fed through lines 108 and 110 through switch 20 to the relay amplifiers 21 through 30. Thus, the proper sign of voltage is always applied to the relay amplifiers 21 through 30.

The signal from inverter 106 is fed through lines 108 and 112 to the differential amplifier 56, amplifier 58, and the parallel arrangement of sine generator 60 and cosine generator 62. Since contact 16*a* is open and contact 16*b* is closed, the output sine function from sine generator 60 is now fed through inverter 114 and switch 16 to obtain the sine of the negative input signal since sine $-x$ equals $-$sine $x$.

I claim:

1. A system for producing signals representing functions of signals representing continuously variable angles comprising: a signal input; a differential amplifier for receiving the signals representing the continuously variable angles fed through said signal input; a relay circuit electrically connected to said signal input, said relay circuit including a plurality of relays successively responsive to predetermined algebraic signal magnitude increments, each succeeding increment representing a successive integer of a predetermined angle; a signal line leading from the relay circuit to the differential amplifier; means controlled by said plurality of relays for feeding a signal from the relay circuit to the differential amplifier, said signal fed to the differential amplifier from the relay circuit being of opposite polarity when compared to the polarity of the signals fed to the relay circuit, and increasing in incremental steps each time a signal representing a successive integer of a predetermined angle is fed to the relay circuit; and function generator means electrically connected to the differential amplifier for receiving the signals from the differential amplifier and generating a function of the received signals.

2. A system in accordance with claim 1 wherein said function generator means are trigonometric function generators.

3. A system in accordance with claim 2 wherein the predetermined angle is 360°.

4. A system for producing signals representing functions of signals representing continuously variable angles comprising: a signal input; a differential amplifier for receiving the signals representing the continuously variable angles fed through said signal input; a relay circuit electrically connected to said signal input, said relay circuit including a plurality of relays successively responsive to predetermined algebraic signal magnitude increments, each succeeding increment representing a successive integer of a predetermined angle; a signal line leading from the relay circuit to the differential amplifier; means controlled by said plurality of relays for feeding a signal from the relay circuit to the differential amplifier, said signal fed to the differential amplifier from the relay circuit being of opposite polarity when compared to the polarity of the signals fed to the relay circuit, and increasing in incremental steps each time a signal representing a successive integer of a predetermined angle is fed to the relay circuit; function generator means electrically connected to the differential amplifier for receiving the signals from the differential amplifier and generating a function of the received signals; an inverter having a first output line leading to the differential amplifier and a second output line adapted to be electrically connected to the relay circuit; and switching means responsive to a change in polarity of the signals representing the continuously variable angles, said switching means operating to switch the input signals through the inverter and electrically connect said second output line to the relay circuit.

5. A system in accordance with claim 4 wherein the function generator is a sine function generator.

6. A system in accordance with claim 5 wherein the predetermined angle is 360°.

References Cited by the Examiner

UNITED STATES PATENTS

| | | | |
|---|---|---|---|
| 2,630,481 | 7/49 | Johnson | 235—154 |
| 2,730,698 | 1/56 | Daniels et al. | 235—154 XR |
| 2,927,734 | 3/60 | Vance | 235—189 |

OTHER REFERENCES

Vol. II, New York, 1961, copyright 1947, "Mathematical Machines," Murray, Columbia U. Press.

Pages 120–124, August 1951, Goldberg, "Step Multiplier in Guided Missile Computer," Electronics.

MALCOLM A. MORRISON, *Primary Examiner*.

WALTER W. BURNS, *Examiner*.